(12) United States Patent
Seal

(10) Patent No.: US 12,258,650 B2
(45) Date of Patent: *Mar. 25, 2025

(54) SYSTEMS AND METHODS FOR IMPROVEMENT OF METAL RECOVERY AND STABILITY OF PILES

(71) Applicant: Differential Engineering Inc., Reno, NV (US)

(72) Inventor: Thomas Joseph Seal, Spring Creek, NV (US)

(73) Assignee: Differential Engineering Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/172,869

(22) Filed: Feb. 22, 2023

(65) Prior Publication Data

US 2023/0349023 A1 Nov. 2, 2023

Related U.S. Application Data

(63) Continuation of application No. 16/049,681, filed on Jul. 30, 2018, now Pat. No. 11,613,793.

(60) Provisional application No. 62/539,363, filed on Jul. 31, 2017.

(51) Int. Cl.
*C22B 3/02* (2006.01)
*C22B 3/04* (2006.01)

(52) U.S. Cl.
CPC . *C22B 3/02* (2013.01); *C22B 3/04* (2013.01)

(58) Field of Classification Search
CPC ....................................................... C22B 3/02
See application file for complete search history.

(56) References Cited

U.S. PATENT DOCUMENTS

| 4,116,488 A | 9/1978 | Hsueh et al. |
| 4,173,519 A | 11/1979 | Parker et al. |
| 4,400,314 A | 8/1983 | Ellis et al. |
| 4,589,488 A | 5/1986 | Schirmer |
| 4,946,312 A | 8/1990 | Loock et al. |

(Continued)

FOREIGN PATENT DOCUMENTS

| CA | 2423101 A1 | 9/2004 |
| CL | 200101598 | 6/2002 |

(Continued)

OTHER PUBLICATIONS

Final Office Action dated Aug. 5, 2022 received in U.S. Appl. No. 16/049,681.

(Continued)

*Primary Examiner* — Christopher S Kessler
(74) *Attorney, Agent, or Firm* — Dorsey & Whitney LLP

(57) ABSTRACT

In embodiments, pressurized fluid containing reagents of formulated mixtures of solids, liquids and gasses are delivered into a cased well then into the heap or pile to open or stimulate new horizontal and vertical fluid pathways, channels, plus drains from the open bottom of the well to the bottom of the heap or pile for fluid collection. This delivery method may also drain any fluids that are retained and pooled in the heap or pile. The removal of pooled fluids will increase the inter-particle cohesion and friction in the heap or pile, thus adding geotechnical stability and resistance to movement of the heap or pile. The cased wells may also add shear strength to the collective to retard movement of the heap or pile.

17 Claims, 5 Drawing Sheets

(56) References Cited

U.S. PATENT DOCUMENTS

| | | | |
|---|---|---|---|
| 5,139,365 | A | 8/1992 | Chesner |
| 8,021,461 | B2 | 9/2011 | Seal |
| 9,050,545 | B1 | 6/2015 | Seal |
| 9,513,055 | B1 | 12/2016 | Seal |
| 9,587,289 | B2 | 3/2017 | Cramer |
| 9,752,207 | B2 | 9/2017 | Seal |
| 2008/0042446 | A1 | 2/2008 | Kurtz |
| 2009/0230207 | A1 | 9/2009 | Guzman et al. |
| 2011/0107877 | A2 | 5/2011 | Seal |
| 2015/0167117 | A1 | 6/2015 | Brueggemann et al. |
| 2015/0275327 | A1 | 10/2015 | Seal |
| 2016/0298435 | A1 | 10/2016 | Mendell |
| 2017/0072440 | A1 | 3/2017 | Seal |
| 2019/0032169 | A1 | 1/2019 | Seal |
| 2019/0153841 | A1 | 5/2019 | Randall et al. |
| 2020/0408077 | A1 | 12/2020 | An et al. |

FOREIGN PATENT DOCUMENTS

| | | |
|---|---|---|
| CL | 201000963 | 4/2011 |
| CL | 201302818 | 3/2014 |
| WO | 2005090748 A1 | 9/2005 |
| WO | 2019027932 A1 | 2/2019 |

OTHER PUBLICATIONS

Notice of Allowance dated Nov. 23, 2022 received in U.S. Appl. No. 16/049,681.

PCT/US2018/044441, International Search Report and Written Opinion, Oct. 17, 2018 00:00:00.0, 7 pages.

PCT/US2018/044441, International Preliminary Report on Patentability, Feb. 13, 2020 00:00:00.0, 7 pages.

Seal, et al., Office Action dated Dec. 8, 2021 for U.S. Appl. No. 16/049,681.

International Search Report and Written Opinion dated Sep. 7, 2023 issued in international patent application No. PCT/US2023/063366.

SYSTEMS AND METHODS FOR IMPROVEMENT OF METAL RECOVERY AND STABILITY OF PILES

CROSS REFERENCE TO RELATED APPLICATIONS

This application is a continuation of U.S. patent application Ser. No. 16/049,681, filed Jul. 30, 2018, issued as U.S. Pat. No. 11,613,793, which claims benefit under 35 U.S.C. § 119 (e) of Provisional U.S. Patent Application No. 62/539,363, filed Jul. 31, 2017, the contents of each of which is incorporated herein by reference in its entirety.

BACKGROUND

A common technique for extracting metal from ores and other mineral material is heap leaching. In heap leaching, mined products as well as many industrial, commercial and residential materials are placed in piles and impoundments, prior to manufacturing and processing for market. Materials may be placed in piles, dumps, landfills, sanitary landfills and impoundments for storage and disposal, both short and long term. Examples include mine waste rock dumps, municipal solid waste dumps, and any-placed dumps or piles. An engineered heap of fragmented, un-consolidated rock or particulate material may be constructed, typically over an engineered liner and liquid collection system for metal, chemical and mineral extraction. A leach solution is applied to and percolated through the heap to contact the material and dissolve one or more metal and minerals of interest into the leach solution. Sprinklers are occasionally used for irrigation of the heap, but drip irrigation is more commonly used to minimize evaporation and more uniformly distribute the leaching solution. The solution, called a "barren solution", containing metal and mineral dissolving reagents or lixiviants, percolates through the heap, leaches the target metal/chemical/mineral/substance, and dissolves other materials. This process, called the "leach cycle," can take between a couple of days to months or years depending on the material being leached. Waste rock, industrial feedstocks, and all types of waste products may be stacked in piles with or without liners, depending on, for example, the material which makes up the pile, existing regulations and storage practices, and short or long-term disposal.

Theoretically, in heap leaching, the barren solution or fluid travels substantially vertically through the heap in a fairly uniform manner from each drip or irrigation point, which is based on the physical and mineral characterization of the material stacked (i.e., its size, voidage, permeability, compaction, etc.) in the formation of the heap or in the material placed underneath each drip or irrigation point. In reality, within a relatively short period of time, a path of least resistance, or a near vertical channel, forms in the heap, starting at each drip or irrigation point, and based on the formation or the material placed underneath the drip or irrigation point. Each path of least resistance is likely to be near vertical for permeable material and near horizontal for impermeable material, and as a result, large sections of the heap may receive no barren solution after a period of time, and relatively little or no leaching of the target material may occur. Also, the leach solution may not uniformly contact all portions of the heap because of permeability variations existing within the heap, such as volumes of clay material with low permeability. In addition, within the heap or pile, there may be material that exhibits low permeability and does not let solution or fluid pass by the force of gravity, thus entraining or pooling the solution above the low-permeable heap or pile material. Such permeability variations may result in preferential flow of the leach solution through more permeable portions of the heap, leaving volumes of under-leached or un-leached material below less permeable portions, and areas of fluid retention and saturation above these less permeable portions.

Also, the chemical properties in some portions of the heap may be less responsive to dissolution of the metal or mineral into the leach fluid. For example, when heap leaching copper with an acid leach solution, high alkaline pH spots within the heap may not respond well to the acid leach solution and may lead to reduced permeability, chemical precipitation, rock decrepitating, migration of fines, heap settlement and compaction, leaving those portions under-leached or un-leached as well as volumes of solution retention and pools in the heap. Metals and minerals remaining in under-leached, un-leached portions as well as pools of fluid with dissolved metals and minerals entrained in a heap during and following heap leach operations often represent a significant loss of un-recovered inventory to a mining operation.

In another example, piles of feedstock and waste may be stacked in a manner to isolate the material from the environment. The piles are often covered and lined to prevent meteoric water from reacting with constituents in the pile and impacting and/or degrading surface and ground water. In heap leaching, a heap collection system collects the resulting pregnant leach solution (i.e., the solution containing the products (metals, minerals and chemicals) of leaching and chemical reactions) drained from the liner and the pregnant solution is then processed to recover the dissolved metal and minerals. Once the target material (including mineral and metal) has been removed from the pregnant solution, the once again barren solution, often containing additional reagents and added lixiviants from processing, may be reused in the heap leach process by pumping the barren solution back to the top of the heap or treated further to remove certain undesirable chemicals or constituents.

A common problem with heap leaching is the non-uniform fluid flow through a heap and resultant incomplete leaching of metals from the heap. Even after extensive leaching over time, some portions of the heap may remain under-leached or even substantially un-leached. In addition, this problem is often associated with uneven permeability of the material placed as a heap, with heap compaction, chemical precipitation, rock and mineral decrepitation, and migration of fines, which separately or together can result in a pool of fluid above a low permeable zone. This pool may be of significant tenor or grade and considered pregnant solution, and may also contain considerable unrecovered metal and mineral values. This pool can migrate in a near horizontal direction and daylight on the side slope of the heap or pile because of the fluid head build up from applied solutions and meteoric rain and snow. The presence of an internal fluid pool within a heap increases the total weight of the heap on the foundation and liner, (example, dry weight compared to wet, saturated weight) and lubricates the heap material thereby significantly reducing the inter-particle cohesion and friction. The undrained weight added to the reduced friction and reduced cohesion for the material in the heap can impact the heap's integrity and geotechnical stability leading to heap movement and failure.

Heap leaching ore generally has a lower metal recovery than grinding and tank leaching of most ores. The finer grind and particle liberation by milling enhances the surface area of the particles thus improving the leaching kinetics and metal recovery. However, mills, tanks and tails disposal represent a large capital, operational and reclamation expense. Heap leaching is less capital and operator intensive and the heaps and solutions are contained within an engineered lined facility.

BRIEF DESCRIPTION

A system and method for rechanneling fluid flow in a heap or pile to recover a target material is described. The system includes a drilled well casing, a pressurized fluid, a pipe, isolation mechanisms, and a control valve. The drilled well casing is positioned substantially vertically within a heap or a pile. Additionally, the drilled well casing includes an open top, an open bottom, and at least one perforation zone having perforations along a vertical section of the drilled well casing. The pipe is positioned within the drilled well casing and the pipe is configured to receive the pressurized fluid. Embodiments discussed herein relate to systems and methods for improving the $H_2O$ I/E, as further described below, in heaps and piles. The systems and methods described herein recover a target material, alter the physical and chemical properties of the material, by using a pressurized fluidization process. The pressurized fluidization process may operate independently of other systems, methods and processes. However, pressurized fluidization may be used in conjunction with other systems, methods and processes. For example, the pressurized fluidization process presented herein may be integrated with JEX technologies, as further described below. By way of further example and not of limitation, the illustrative embodiments include combining the pressurized fluidization process with systems, methods and apparatuses described in U.S. Pat. Nos. 8,021,461, 9,050,545, 9,513,055 and 9,752,207, each of which are incorporated herein by reference, and which may also be referred to as the "JEX technologies," and that name the same inventor as the present application.

JEX and HYDRO-JEX© are trademarks used by Metal Recovery Solutions, Inc. "JEX" or "JEX technologies" refers to the process of using high pressure injection to stimulate channels in a pile for chemical, biochemical and physical change and metal, chemical and mineral extraction. This process is also referred to herein interchangeably as "I/E" or the "I/E process". In general, HYDRO-JEX refers to a process for a particular use of water chemistry in the I/E process, such as illustrated in U.S. Patent Publ. No. US2015/0275327, and is referred to herein as "$H_2O$ I/E." or the "$H_2O$ I/E process". The term "I/E technologies" is used to refer to the I/E processes and $H_2O$ I/E processes.

The systems, methods, processes and apparatus presented herein are referred to as "pressurized fluidization," which incorporates reagent addition with the pressurized fluidization process. By way of example and not of limitation, pressurized fluidization may be integrated with the I/E process, the $H_2O$ I/E process or any combination thereof. More specifically, pressurized fluidization refers to the fluidization of particles that occurs when fluid is added with sufficient pressure, momentum and force to move a particle or impart a momentum to a resting particle in a pile. In some of the illustrative embodiments, the systems and methods presented herein employ pressurized fluidization in the interior of a pile or in situ, thereby being confined and contained by the surrounding material of the pile for a designated period of time to minimize the impact on the pile's geostability. By way of example and not of limitation, pressurized fluidization may be used to treat higher grade material that is segregated and placed in an identified heap location to recover the target material, metal and mineral and/or to alter the physical and chemical properties of the material, metal and mineral to approach milling recovery at a much-reduced capital and operational cost. Milling is a mineral process that uses size reduction to enhance mineral liberation and to improve target mineral, metal and material recovery at a much higher cost.

In one illustrative embodiment, the $H_2O$ I/E process incorporates the pressurized fluidization process in heaps and piles as described in further detail herein. Pressurized fluidization systems, methods and apparatus have shown significantly improved kinetics when compared to normal atmospheric pressure and temperature leaching in a heap or tank for the same size of material.

Fluids introduced into a near vertical cased well by gravity fluid flow do not achieve sufficient head or pressure to substantially fluidize or move particles in a productive manner because the in situ pile pressure is greater than the pressure imparted by the flow of fluid from a gravity well. Thus, the gravity cased well fluid flow will not achieve a significant horizontal wetting impact and will not rechannel fluid pathways in the pile. In fact, gravity fluid flow in a cased well often promotes water fluid build-up and pooling leading to pile movement, instability and failure.

In the illustrative embodiments presented herein, the pressurized fluidization process described herein can be used with a particular material with significant grade or specific mineral characteristics, that can be specifically placed in a designed and specified location in a pile with the purpose of using the pressurized fluidization systems, methods and apparatus for biochemical, chemical, geotechnical, physical results, extraction treatment or any combination thereof. Thus, the I/E technologies are not simply limited to mature or existing heaps and the I/E technologies (in combination with pressurized fluidization) can be used to recover a target material and to alter the physical and chemical properties of the material in any pile.

Similarly, $H_2O$ I/E technologies, like HYDRO-JEX, can also be used in stages to accommodate various different chemical and biological reactions, plus changes in the physical conditions of a pile in time. By altering one or more parameters such as the induced pressure, reagents, lixiviants, pH, Eh, fluids (i.e., mixtures of solids, liquids, gasses and bacteria, plus all pumpable material) and time for the chemical and biological reactions and rest periods when added to specific zones in a pile, the material in the pile can be subjected to a host of various conditions to promote a selected chemical, oxidation, reduction, biooxidation, bioreduction, or biochemical products or conditions that favor the desired effect of leaching metals, storing material, stabilizing and closing a pile.

The promotion of zonal biooxidation of pile material over time, followed by altering the pH for metal dissolution or leaching, changes the zonal conditions in the heap or pile, which allows leaching of precious metals, e.g., gold, or changes the chemistry to optimally leach silver.

Other examples include but are not limited to leaching soluble base metals under a variety of chemical, biological, microbiological and physical zonal conditions followed in time by altering the chemical, biological, microbiological and physical conditions to leach precious metals. The reverse may also be utilized, by leaching the precious metal first then later altering the chemistry to leach the base metals. In addition, the chemistry, biochemistry and microbiology of the zones can be altered for long term storage of pumpable material that may be hazardous or for closure of a pile with negligible impact on the environment.

The pressurized fluidization processes can be used in combination with the I/E technologies for detailed planning and placement of material on a heap leach pad, pile, dump, landfill, sanitary landfill and impoundment to (i) enhance metal and mineral production, (ii) target and change the chemical/physical status and properties, and (iii) improve geotechnical stability. Embodiments may be incorporated in existing and mature heaps, piles, dumps, landfills, sanitary landfills, and impoundments, to utilize in situ pressurized fluidization of the material to improve reagent utilization, metal, chemical and mineral extraction and selected, designed chemical and biochemical reactions and kinetics. As discussed herein, detailed planning and placing of selected material in heaps, piles, dumps, landfills, sanitary landfills and impoundments may be used, for example, in various I/E technologies for optimal metal recovery, improved geotechnical stability, adjustment of chemical or physical properties, and enhanced closure stability. The present disclosure involves the technologies using pressurized fluidization in the planned construction and stacking of heaps, piles, dumps, landfills, sanitary landfills and impoundments, and may include segregated placement of material with specific physical and chemical properties. Material may be placed at specific locations in a heap, pile, dump, landfill, sanitary landfill or impoundment in order to incorporate the I/E technologies, e.g., JEX technologies, in addition to using the pressurized fluidization technologies disclosed herein.

Terms used throughout this disclosure include pile, heap, dump, impoundment, landfill (industrial, municipal, garbage, sanitary) or man-placed mass or material stacked or placed for temporary, short term, long term or permanent storage. A pile includes stacked and/or placed material above native soil, with a foundation or visible separation. A heap leach pad is a pile with a liner and a collection system to contain and recover the pregnant solution (fluids containing products of leaching and chemical reactions), below the stacked material for metal, chemical and mineral extraction. Piles, dumps, landfills, sanitary landfills, and impoundments, may have material placed with confining sides to contain solids and liquids, but generally do not have a bottom collection system. An impoundment may be lined and may have a surface solution collection system.

In the illustrative embodiments, wells having a perforated well casing are installed into a pile, or heap, which will be leached, chemically, biochemically or physically altered, and impacted. The well includes one or more perforated sections, i.e., zones, which are designed such that during a fluid stimulation, e.g., a fluid injection under pressure, the fluid impacts a geometric volume of the heap or pile. The volume of the heap or pile affected by the fluid depends upon fluid pressure, volume and location of the zone isolation mechanisms.

In embodiments, a fluid containing any combination of lixiviants, chemicals, biochemicals, solid, liquid and gaseous reagents, may be delivered into the cased near vertical well through one or more conduits or pipes and may include meteoric water traveling through the pile. The chemicals and biochemicals in the fluid may further be mixed together and/or with other ingredients, being solids, liquids and gasses or any combination thereof, to fit the pile treatment application. The fluid may thereafter be screened, mixed and delivered, for example by being introduced under pressure required for delivery of the fluid through a perforated well, deep into a heap leach pad or pile to leach, re-leach, promote select chemical and biochemical reactions with augmented reaction kinetics by incorporating pressurized fluidization to the target material, alter the chemistry, microbiology and physical properties, dry and/or rinse extracted components of interest (such as metals for recovery) and long term pile physical, geotechnical, chemical, and biochemical characteristics. The delivery method may open or stimulate new fluid pathways or channels by fluidizing and moving the particles in the pile, thereby creating new channels, and allowing fluids to interface with the target zone for treatment under pressure. The process does not involve hydraulic fracturing of the material but relies upon pressurized fluid rechanneling through the stacked material. The system may include a mobile apparatus (e.g., a mobile trailer or skid) installed near or at the vicinity of the injection well.

Material and particles placed in a pile will have different degrees of permeability, or the ability to allow fluids to pass down by gravity. As additional material is placed or stacked on the pile, the weight above may compress or reduce the permeability of the material below. When the permeability reaches a minimum, water fluids flow downward is reduced or stopped allowing the water fluids to build up or pool. This water fluid reduces inter-particle cohesion and friction within the pile and adds water fluid head and solution weight, thereby imparting reduced resistance to both pile movement and to pile geotechnical stability. As water fluid height increases, the water fluid flows laterally until the water fluid finds an area of improved permeability to then continue downward by gravity. As the volume and velocity of water fluid increases, the water fluid creates channels, just like ditches are formed with intense rainfall. These channels then provide preferential flow for the water fluid. The material below the low permeability area receives little fluid and promotes un-leached, unreacted or under leached and under reacted volumes of material in the pile. The channeled water fluid area receives excessive quantities of water fluid which dilutes the dissolved metal, chemical and minerals reporting to the pregnant solution.

In embodiments, by altering the delivery method in each zone during pressure stimulation and fluidization, new channels and fluid pathways open by moving the particles in the heap or pile, thereby changing or rechanneling the fluid pathways established by gravity water fluid flow. Directional pressure fluidization opens drainage pathways to create additional channels or rechannels from the open cased well bottom to the bottom of the heap or pile, thereby creating a drain system in-situ in the heap or pile. The drain system may be positioned above a platform, foundation, or terrain contour, e.g., a natural contour of native earth or compacted native earth, with or without a liner, that conducts solution to a location, pond, or low spot above the natural under pile material or native earth, located down gradient from the heap or pile.

The application of a pressurized fluid into a perforated near vertical well, open on the top and bottom, with the invented delivery method establishes a substantially or near vertical system of drains into the heap or pile, thus allowing entrained solution or fluid within the heap or pile to drain to a pond or a natural or designed contoured low spot by gravity. These installed drains from the bottom of the drill casings reduces the weight of the material on the bottom liner material and the heap or pile foundation, sides, and side slopes of the pile by draining any in-situ solution or fluid from surface solution application or meteoritic events. This can enhance the inter-particle cohesion and friction within the pile by reducing particle voidage, fluid saturation, solution head and solution weight, thereby imparting improved resistance to pile movement and improved pile geotechnical stability. In a further illustrative embodiment, the well casing material may also improve the geotechnical stability of the placed material by installing the cased well with well casing or pipe of a shear strength greater than the heap or pile material's shear strength, thereby imparting improved heap or pile geotechnical stability to prevent heap or pile movement and failure. The solution or fluid may be entrained in a heap leach pad or pile as a pool, may contain dissolved metals or chemistry consistent with un-recovered inventory, or hazardous or environmentally harmful fluid. With the use of the installed drains, these dissolved metal and/or mineral values and dissolving fluids will continue to drain by gravity to the collection location for recovery, treatment and management not available when the solutions and/or fluids are entrained in a heap or pile.

Embodiments may incorporate a trailer or skid apparatus, which may include instruments configured to perform a number of functions including, but not limited to, measurement of flow and pressure of the aqueous solution and other fluids containing various combinations and formulations of solids, liquids and gasses. The trailer or skid may further include a high pressure, low volume compressor to inflate isolation mechanisms, a straddle zone isolation mechanisms, and a control valve to isolate a specific elevation in the pile for selective treatment, injection, leaching, rinsing and/or recovery of metals, and alteration of chemistry, geotechnical properties and physical properties of the material in a heap or pile. Various embodiments may enable any one or more of higher flow rates, higher pressure, and delivery to increased depths, while maintaining and/or enhancing safer operations.

BRIEF DESCRIPTION OF THE SEVERAL VIEWS OF THE DRAWING

Non-limiting and non-exhaustive examples will be described with reference to the following figures, wherein like reference numerals refer to like parts throughout the various figures.

DETAILED DESCRIPTION

As used herein, the terms "heap," "heap leach," "dumps," "waste dumps," "landfill," "sanitary landfills," "process tails," "stockpiles," "process piles," "garbage dumps," "refuse," "deposit," "rubbish pile," "industrial and urban waste," "lot," as well as any material placed in a pile for temporary storage or long term storage or disposal (collectively referred to herein as a "pile"), illustrate an application of the systems and methods described herein. The disclosed systems and methods are not limited to use with heaps and for heap leaching. Rather, the embodiments described herein apply to all piles constructed of collected material (whether lined, unlined or contained) and/or that are open to the environment. As such, the systems and methods described herein may be used to treat any material in storage or disposal in a pile, impoundment, dump, landfill, (industrial, municipal, garbage, sanitary, which are collectively referred to herein as "sanitary"), and used for any type of percolation leaching, dump leaching, crushed leaching, ore pile leaching, run of mine leaching, bio-leaching (aerobic and anaerobic) or any other leaching methods where ore or material is placed on or over an engineered liner with a collection system, or material is placed with or without a foundation, which contains the pile plus fluid or is open to the environment, like process stockpiles, waste dumps, all of which are also collectively referred to herein as a "pile," regardless of the design of the heap, pile, collection system pipe work, ditches, ponds, liner, drain rock and regardless of whether such piles include ore, waste, refuse, trash, garbage, or other materials.

Figure 1:
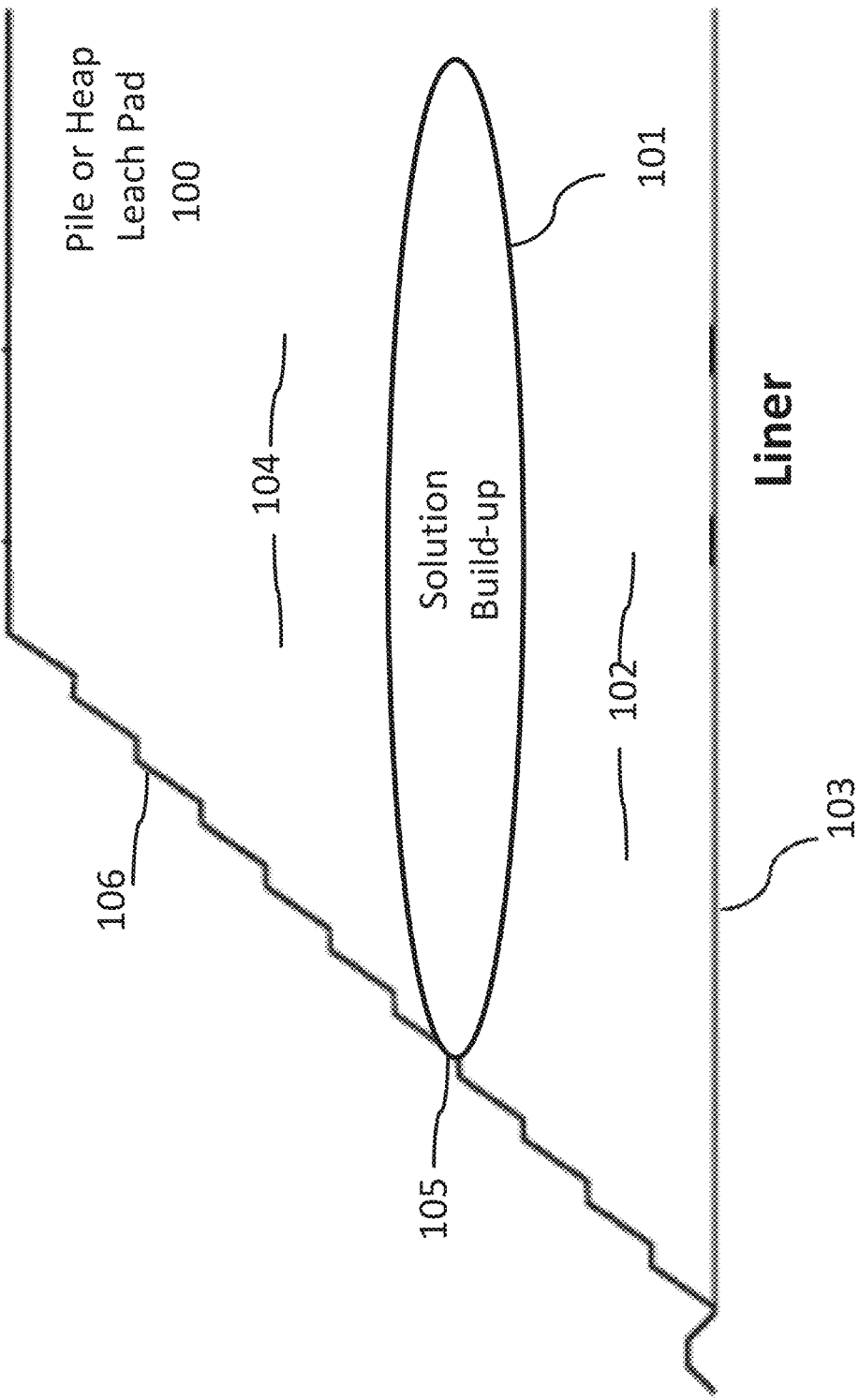
FIG. 1 is an illustration of a heap or pile with retained fluid or a pool of solution above a low permeable zone that has flowed in a near horizontal direction to day light or flow from a side slope of the heap or pile.

FIG. 1 depicts an embodiment of a rechanneling system comprising a heap leach pad or pile 100 and an accompanying solution build-up 101, i.e., a retention of a volume of fluid as a pool of solution. The solution build-up may originate from a surface application of solution and meteoric water. Below the solution build-up 101, is a layer comprising a volume material with low permeability 102, which traps fluid moving in a downward direction through the heap or pile by gravity, and reduces the ability of the solution 101 to flow or drain downward to the lower layer 103. In various embodiments, the lower layer 103 may be one or more of a liner, a foundation, a containment structure, or native earth.

The solution build-up 101 may occupy a variety of geometrical shapes and configurations depending on factors such as the porosity of the material saturated by the solution, the material voidage, the permeability and configuration of the material below the build-up 102, the permeability and weight of the material 104 above the build-up, and the quantity of meteoric solution or other solution applied to the surfaces of the heap or pile.

In an embodiment, a solution build-up 101 may accumulate enough fluid to day light, i.e., extend to and/or seep from, an edge, side, or side slope of a heap or pile 105. A day light of solution indicates an internal volume of fluid trapped in the heap or pile, and can often lead to slope sluffing, movement, and/or failure. Since the solution build-up is essentially a pool of fluid, a day light of the solution build-up leads to reduced cohesion and inter-particle friction in the heap or pile, and lubricates particles for movement by external forces, such as gravity and the weight of material above the solution build-up. As a result, slope movement and heap or pile failure can occur. For these reasons, fluid day light on a heap or pile is commonly recognized as an indication of geotechnical instability preceding a geotechnical failure.

In many cases, however, the solution build-up is located such a significant distance from the edge or side of the heap or pile 106 that the solution build-up does not day light or seep towards an edge or side.

In various embodiments, a material with low permeability 102 lies below the solution build-up. In an embodiment, the material 102 is clay. In other embodiments, the material 102 is any compacted material, which may be compressed by settlement or consolidation by the weight of the material 104 above. Various examples include, but are not limited to, materials produced through chemical precipitation, materials produced though rock or mineral decrepitation, migrated fines, material clogging systems, and/or damaged drainage systems.

Figure 2:
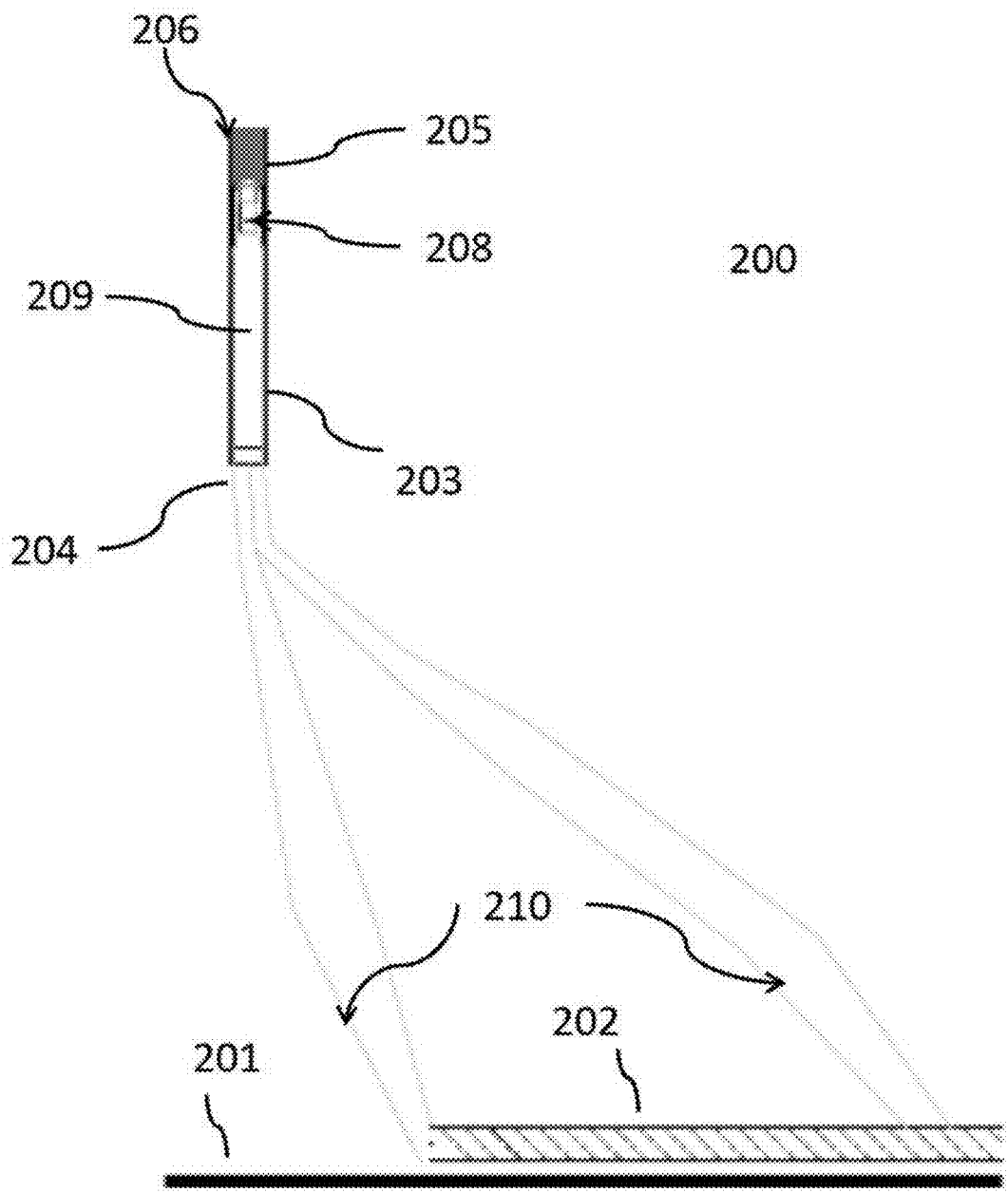
FIG. 2 is an illustration of the bottom of the well casing, which is imparting horizontal shear strength to the pile, with an isolation mechanism above to dedicate the pumped fluid through the bottom of the casing to establish substantially near vertical channels or a drain to the liner and collection system below.

FIG. 2 depicts an embodiment of a system installed in a heap or pile of stacked, placed, and/or deposited material 200, as discussed above. Beneath the heap or pile there may be an engineered liner 201, which may include low permeable materials such as combinations or single layers of clay, high-density polyethylene (HDPE), geotechnical material, synthetic and/or natural material for containment, and cushion and/or drain layers.

In an engineered heap or pile there is generally a collection system or network of pipes and conduits 202 positioned above the liner to conduct the accumulation of solution, through gravity, to a pond or collective impoundment for treatment. In an embodiment, a drilled well casing 203 may be installed in the system, the drilled well casing may include an open pipe or open bottom 204 (and may have a higher shear strength than the stacked or placed material) and be directed towards the heap or pile at a distance from the liner 201 and collection system 202. In various embodiments, the well casing pipe may be a pipe and include one or more zones, each comprising a plurality of perforations, which may extend along a length of the drilled well casing, along the casing's exterior, and/or above the open bottom section 204. The zones may be used for horizontal zone stimulation, as discussed below, by pumping a fluid through the drilled well casing.

In embodiments, various techniques may be utilized to open the bottom 204 of the perforated drilled well casing 203 so that the casing acts as a drain for fluid pumped through the drilled well casing 203. In one example, the drilled well casing 203 does not have a stem, plug, or isolation mechanism to prevent the drainage of added fluid 206. Thus, when fluid is added to the well, especially fluid under pressure, the bottom acts as a drain through which the fluid flows. In other embodiments, a drain may be included by installing a down well isolation mechanism 205 that selectively directs pumped fluid at the top of the well casing 206 through a control valve 208.

In an embodiment, the isolation mechanisms 205 include a first mechanism configured to seal the drilled well casing above and below at least one zone to isolate a first flow of the fluid through the perforations of that selected zone, and a second mechanism, a control valve 208 configured to open and close or seal the drilled well casing above the open cased well bottom to isolate or control a second flow of the fluid through the open bottom. The first flow creates a plurality of substantially horizontal fluid channels in the heap or pile, whereas the second flow creates a substantially vertical fluid channel through the open bottom of the well casing into the heap or pile. In an embodiment the control valve is open or the isolation mechanism is not employed such that the fluid pumped into the pipe flows through both the perforated well casing section and open bottom to create a plurality of horizontal and vertical fluid channels. In another embodiment, the control valve is closed or the isolation mechanism is employed so the pumped fluid may flow through only one of the isolation mechanisms directing the fluid flow through one or more of the perforated zones in the well casing creating a plurality of substantially horizontal fluid channels in the heap or pile.

In various embodiments, the control valve 208 can control one or more of a rate and volume of the pumped fluid. Once the pumped fluid passes through the control valve 208, the fluid may travel through the well casing 209 to the open well bottom 204, or through the perforations.

After passing through the well casing bottom 204, the pumped fluid, which is often of greater pressure than the local pile pressure, may create stimulated, pressured channels 210 that travel substantially vertically through the heap or pile towards the liner 201 and collection system 202, thus establishing a gravity drain between the well casing and the collection system 202 and liner 201. Thereafter, pressurized fluid may flow from the well casing, through the stimulated, vertical channels 210, to the collection system 202 above the liner 201.

In an embodiment, the installed drilled well casing will have designed perforated zones and an open top and bottom. The system may include a smaller pipe than the well casing positioned within the drilled well casing, configured to transport the fluid. The isolation mechanism 205 may include a first isolation mechanism configured to seal the drilled well casing above and below at least one zone to isolate a first flow of the fluid through the perforations of at least one zone, wherein the first flow creates a plurality of substantially horizontal fluid channels in the heap or pile; and a second isolation mechanism or control valve configured to seal the drilled well casing above the open bottom to control a second flow of the fluid through the open bottom, wherein the second flow creates a substantially vertical fluid channel into the heap or pile.

Figure 3:
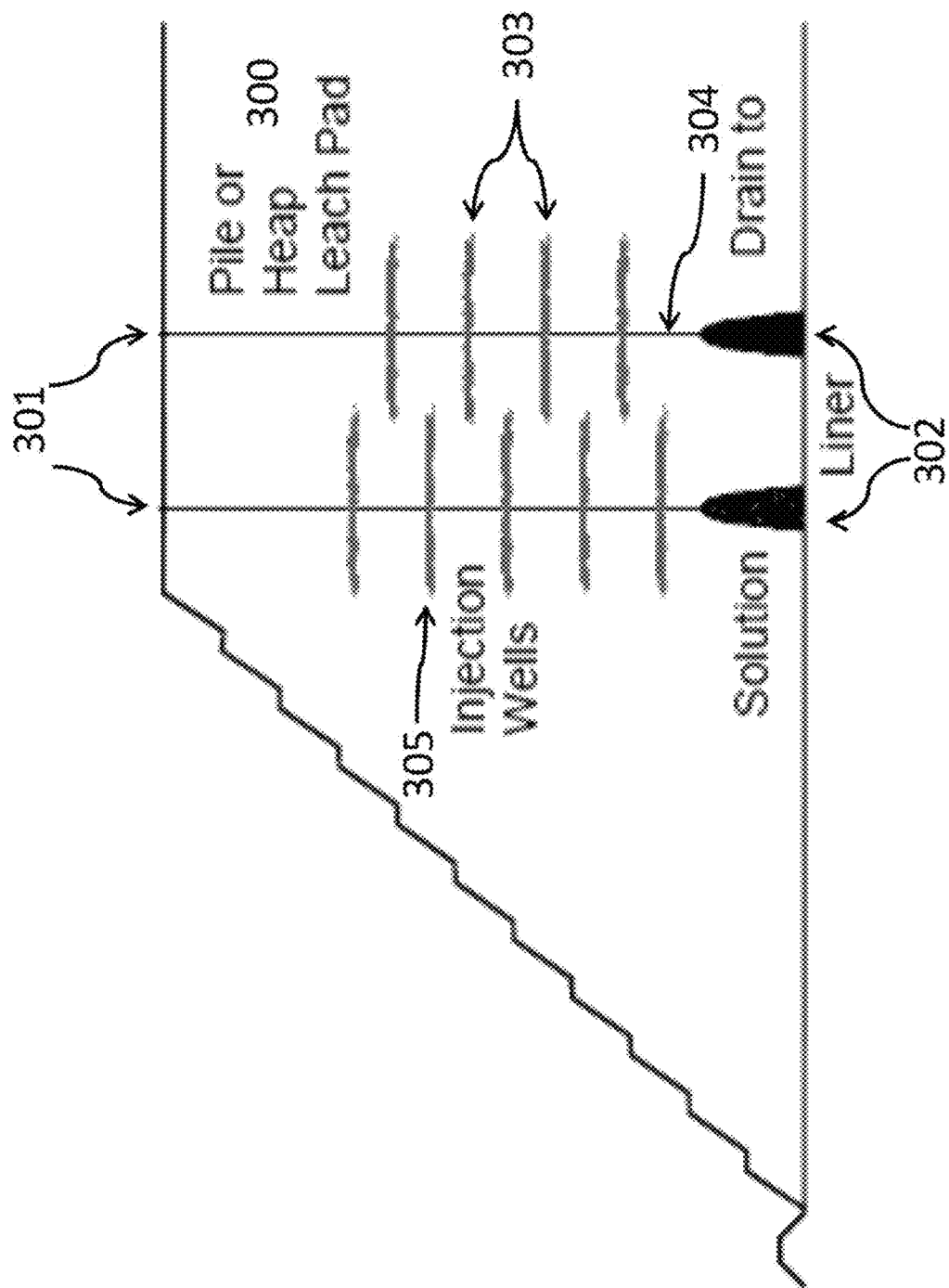
FIG. 3 is an illustration of post stimulation via $H_2O$ I/E where the technology has installed substantially near vertical drains to the liner or foundation or natural contour of the heap or pile in order to improve geotechnical stability.

Turning to FIG. 3, an illustration of post-simulation via $H_2O$ I/E is depicted. In the embodiment, $H_2O$ I/E cased wells 301, of pipe material with a shear strength greater than the material in the pile, are installed in the pile/heap, and drain to the liner, or foundation, in order to improve geotechnical stability. Although two wells are depicted, it will be appreciated that the number of wells are not limited to two. There may be a plurality of $H_2O$ I/E cased wells installed, depending on the heap or pile configuration and post-stimulation goals.

In an example embodiment, a solution may fill a height in the I/E well, resulting in a pool of solution, e.g., a solution build-up 101, as depicted in FIG. 1, after installation of the $H_2O$ I/E well, but prior to stimulation or adding fluids and pumping. The solution build-up may be drained using one or more stimulation techniques. In one example, by altering the stimulation technique, compressed and pressurized fluid may be pumped in the I/E well to fluidize and overcome the low permeability of the volume of material below the pool, and consequently establish channels or drains 302 leading to the liner, foundation, or natural contour of the heap or pile. In various embodiments, isolation mechanisms such as valves, plugs, packers, stems, stents, stoppers, inflated or fluid filled hoses, conduits or pipes can be designed and installed both temporarily or permanently in the I/E well, for example, at the bottom 304, the location of the zone perforation stems 305, or throughout the entire I/E well. The installation position may isolate one or more I/E wells and zones or stop fluid drainage from an I/E well to the foundation.

Draining the solution build-up reduces the weight of the heap or pile 300 on the liner, foundation, collection system, natural contour, compacted native earth upon which it may be placed, and may further stimulates zones in the I/E wells 301, thereby establishing additional realignment of in-situ heap or pile voidage 303 and installing additional channels from the I/E well to the heap or pile 301. Accordingly, when any pressurized fluid and/or isolation mechanisms are removed, the stimulation established channels continue to allow drainage of fluid 302 back to the I/E well. Thus, installing drains 301 into a heap or pile establishes a drain towards the liner, foundation, or natural contour 302, which will prevent solution from accumulating within the heap or pile.

Embodiments of the systems and methods disclosed herein have demonstrated the observed property of pressurized fluidization that significantly improves the rate of chemical reactions and reagent utilization in situ. This improved rate is far greater than the rate of chemical reactions found at atmospheric pressure or room pressure. By increasing the pressure and in situ fluidization, in accordance with embodiments, gas solubility and accompanied reagents, chemicals, minerals, materials and metals solubility are enhanced. As a result, the reaction and leaching rates are kinetically improved, thereby shifting the equilibrium to designed and desired reaction products at a faster rate than at room pressure.

Figure 4:
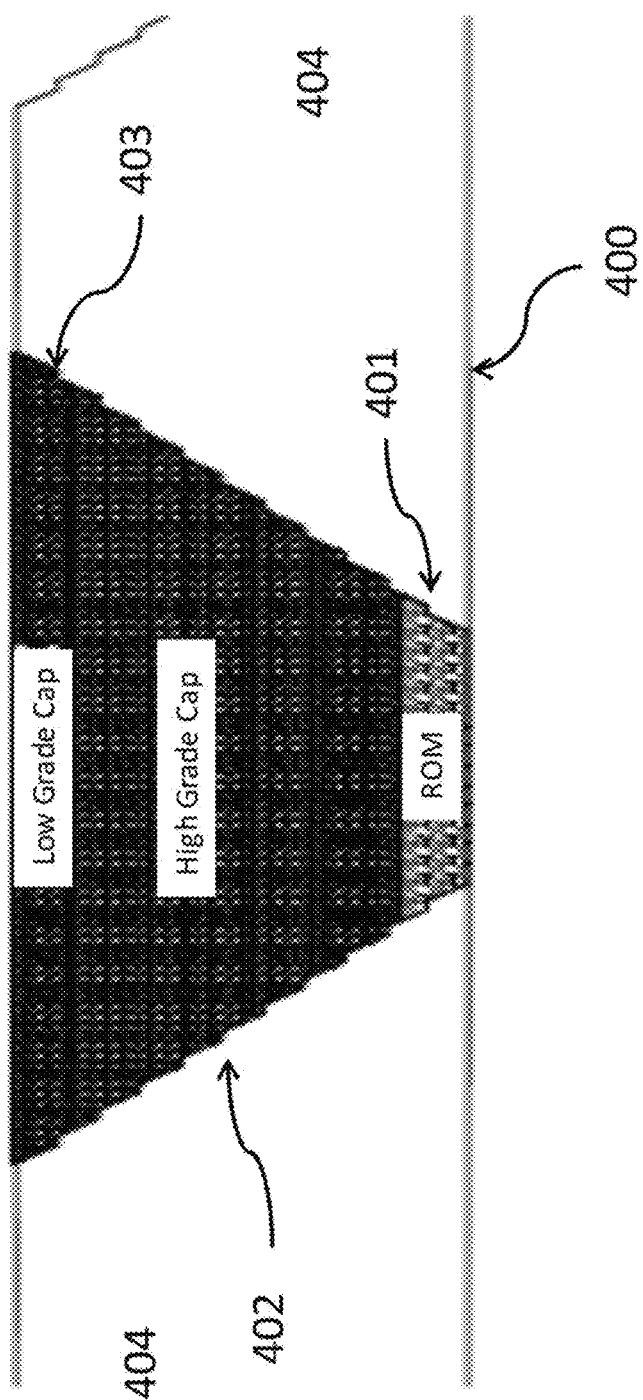
FIG. 4 is an illustration of a pile (heap) that has been designed, constructed and had the placement of selected, segregated material carried out that allows the optimal the use of the I/E technologies.

FIG. 4 illustrates an example pile/heap design for selective, segregated placement of material in a specific location of the heap or pile 400. Many I/E technologies are incorporated in existing, often mature, heaps/piles that will not receive any future material, however the present disclosure incorporates the planned use of I/E technology and particular material placement to optimize the impact of the I/E technologies on the pile/heap.

In some embodiments, I/E wells are installed a distance above the engineered liner, foundation, and containment system, in order to preserve the integrity and holding capability of the liner, foundation, and containment system during drilling and well placement. As such, the well's position prevents breaching the liner, foundation, and containment system below the heap or pile. Depending upon geometrical considerations of the I/E well and installation process, highly permeable material may be selected and segregated for placement on the heap or pile, and carefully placed as over-liner 401 above the liner, foundation, and containment systems 400 of the heap or pile, to optimize the draining of fluids from material above the over-liner 401. The drained fluids may be barren or pregnant solution, fluids, slurry, meteoric water, e.g., rain and snow, and/or other solution, which may be pumped or supplied to the heap or pile.

The layer above the over-liner layer may include selected additional high-grade material 402 having unique properties, such as a particular metal grade, mineral grade, chemistry, microbiologically and/or other hazardous or harmful property. The additional high-grade material 402 may be stacked in layers or lifts, and surface treated like a normal heap leach, waste rock pile, or other material pile. Additional select material is placed as a new layer or lift upon the heap or pile 402 and treated in a normal cycle. Thus, each stacked layer is stacked and subjected to normal treatment until the layer reaches a desired height.

Because I/E technologies introduce high pressure fluid into a heap or pile, a safe distance from the surface of the pile must be maintained so that fluid does not daylight on the surface and side slopes of the pile, cause instability, or otherwise impact operations. Thus, a cap 403 of material is placed over the segregated high-grade material 402, to maintain a safe distance equal to the height of the cap layer 403. In various embodiments, the cap 403 material may be subject to normal surface treatment, but will not be treated by the I/E technologies and will not have any zones/drains installed.

Surrounding the column of selected material, 401, 402, 403 may be a natural material, e.g., native soil, 404 for treatment in a heap or pile. In an embodiment, the middle layer 402 and surrounding material 404 are the same.

An object of selectively stacking material, as depicted in FIG. 4, is to place the material 402 in an identified, surveyed location, to be located again after cap placement 403, and/or treated by the I/E technology in the future. An example is stacking high-grade material, 402 for metal, chemical and mineral extraction. Deposits often contain some high-grade ore and generally there is lower recovery from normal heap leaching high-grade ore. By segregating and stacking this ore in a known location and treating the ore lift by lift, with normal heap leaching, i.e., a surface barren application, a column of lifts of high grade material may be leached.

After normal surface application heap leaching of the high-grade ore lifts, operations can then place a cap of material 403 over the high-grade lifts, surface leach the 403 lift, and when the heap or pile reaches the permitted ultimate height, I/E wells can be specifically designed and installed. These I/E wells are stimulated and subjected to pressurized fluidization systematically to open new channels in the heap, drain all internal solution pools, sweep dissolved metal values, re-leach metal values, and introduce fresh leaching reagents and lixiviants. The post stimulation I/E wells can then drain all local heap or pile pregnant solution to the liner for collection, e.g., FIG. 3, 302.

Laboratory experiments show that leaching a volume of material under high pressure at room temperature is over four times faster than just room pressure leaching. With the higher pressures imparted to the heap or pile during $H_2O$ I/E stimulation, even higher leaching kinetics are possible. The I/E well can also be rinsed and re-leached periodically to complete the optimal leach cycle for maximum recovery. In another example, potentially acid generating material (PAG) may be selected, segregated and stacked, 402. This locatable volume of material in the heap or pile with specific mineralogy, chemical and physical properties, can be treated by the I/E technologies in the future for changes in chemistry, improved stability, impart biological activity (aerobic and anaerobic), solution drainage, improve long term chemical and physical stability, and isolation from the environment of all harmful fluids and solids. A good example is to treat a located volume of acid rock drainage material in a pile with a slurry of reagents and a base to raise the pH and precipitate arsenic in the pile.

While particular embodiments of stacked heaps/piles have been discussed herein, it will be appreciated that a heap or pile may be planned, designed, permitted, built, and/or constructed with or without containment, such that any material may be stacked, conveyed, dumped, and/or placed upon the foundation, liner, or natural contour to leach, extract metals and minerals, chemically, biochemically and physically alter the materials, contain the materials, promote geotechnical stability, store and/or isolate the material from the environment, and/or promote sound environmental short and long term storage and deposition by the planned integration or use of the I/E technologies.

Figure 5:
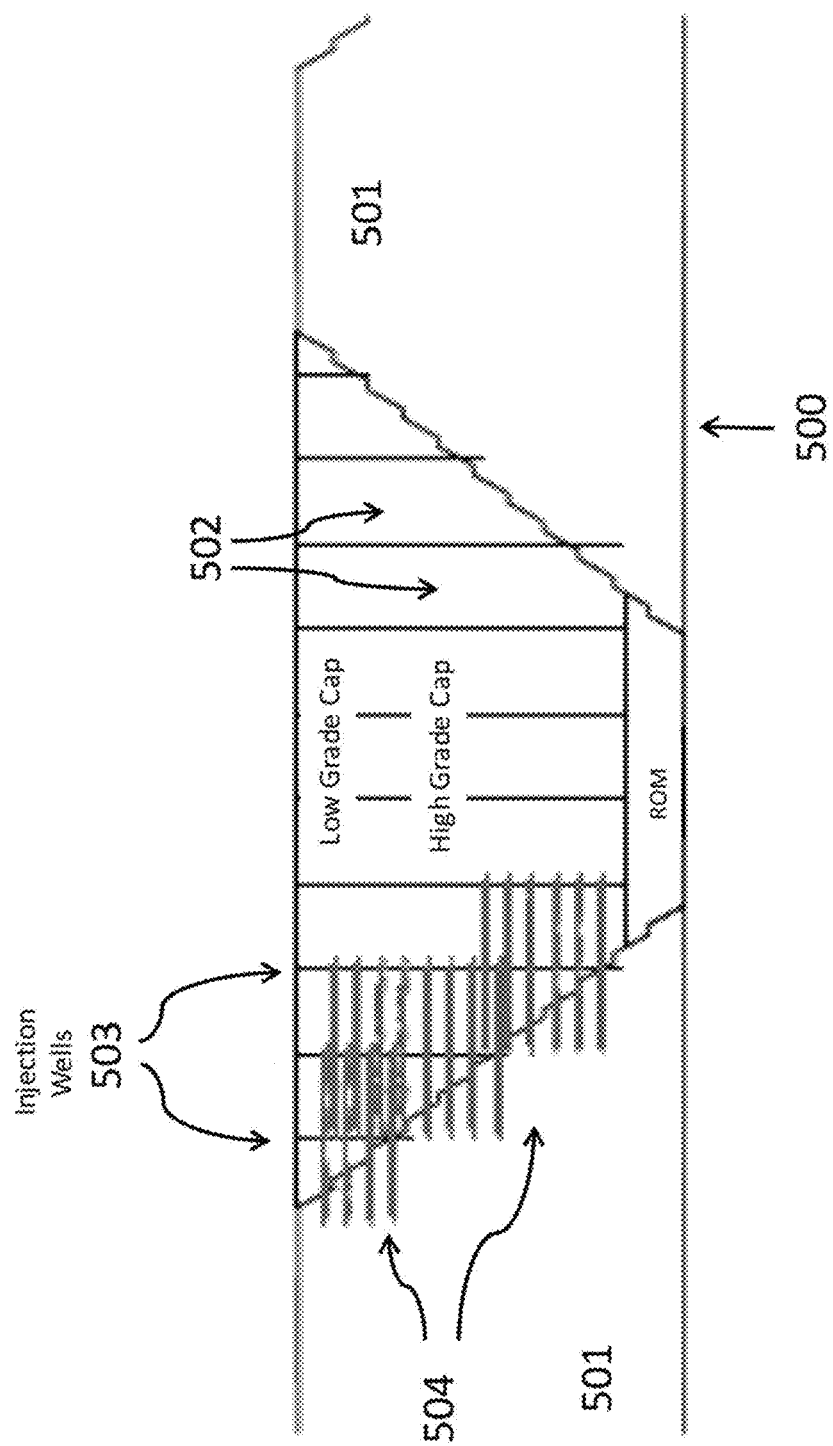
FIG. 5 is an illustration of I/E technologies used to optimize metal and mineral recovery, and to change and treat the chemistry, microbiology and physical properties of the material for short and long-term storage and disposal, including the addition of installed drains.

Referring now to FIG. 5, the heap or pile from FIG. 4 may be subjected to the installation of I/E wells for treatment. The heap or pile may have a liner, foundation, or containment, or may be placed on native soil, 500. I/E wells are designed, surveyed in and installed with zones into the heap or pile at an optimal distance for treatment, 503. Although FIG. 5 depicts ten installed I/E wells 503, any number of I/E wells may be used for treatment of the heap or pile 501 and selective location 502 (i.e., element 402 in FIG. 4). Because of the material properties (e.g., chemical, biological, physical and geotechnical) of the selectively placed, targeted material 502, the location of the I/E wells and zones in the I/E wells, 503, may be modified from traditional I/E wells. The I/E wells, 503, may have a unique location and design, 503, and a unique selective treatment fluid makeup 503, to address the enhanced recovery of metal and minerals, alter chemical, microbiological or physical properties, and improve the long-term stability of the targeted treated material, 502.

Depending on the properties and location of the targeted material, 502, I/E well spacing, 503, the location or depth of perforated installed well casing or zones may vary to optimize the treatment and drainage of fluids from the heap or pile, as discussed above with respect to FIG. 3, 302. In addition, other slurries of fine material (i.e., pumpable size) may be introduced into the void space in between particles in the heap or pile 502, and the channels introduced during stimulation, 504, to fill the void spaces to store the fine material. In an example, fluids containing hazardous elements like mercury can be precipitated using reagents added at or before the well head, and selectively stored in the void spaces created by the I/E stimulation. These stored elements can be leached in the future by altering the injected reagents via I/E wells. In another example, ground mill tailings can be stored in the created void spaces, e.g., as pumped slurry, or treated during pumping, with reagents entrained in fluid and deposited in the void space in the heap or pile. These stored materials can be further treated in the future with other I/E technologies for long term stabilization, storage and disposal or future recovery if market conditions exist.

The methodologies described herein may be implemented by various methods, depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein may be presented in terms of symbolic representations of operations on binary digital signals stored within a memory of a specific apparatus or special purpose computing device or platform. In the context of this particular specification, the term computer or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here and is generally considered to be a self-consistent sequence of operations or similar signal processing leading to a desired result. In this context, operations or processing involve physical manipulation of physical quantities. Typically, although not necessarily, such manipulation of quantities may take the form of electrical, pneumatic or magnetic signals capable of being stored, transferred, combined, compared or otherwise manipulated.

It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference throughout this specification to "for example," "an example," and/or "another example" should be considered to mean that the particular features, structures, or characteristics may be combined in one or more examples.

While there has been illustrated and described what are presently considered to be example features, it will be understood by those skilled in the art that various other modifications may be made, and equivalents may be substituted, without departing from the disclosed subject matter. Well known process steps and structures have not been described in detail in order to not unnecessarily obscure the other descriptions provided herein. Additionally, many modifications may be made to adapt a particular situation to the teachings of the disclosed subject matter without departing from the central concept described herein. Therefore, it is intended that the disclosed subject matter not be limited to the particular examples disclosed.

What is claimed is:

1. A system for rechanneling fluid flow in a heap or pile, comprising:
   a drilled well casing positioned substantially vertically within a heap or pile, the drilled well casing comprising an open top, an open bottom, and at least one perforation zone comprising a plurality of perforations along a vertical section of the drilled well casing;
   a pressurized fluid;
   a pipe positioned within the drilled well casing, the pipe configured to receive the pressurized fluid;
   a first isolation mechanism configured to seal the drilled well casing above the at least one perforation zone; and
   a control valve configured to selectively direct the pressurized fluid into an interior of the heap or pile through the at least one perforation zone or the at least one perforation zone and the open bottom,
   wherein the control valve is configured to close or employ a second isolation mechanism to seal the drilled well casing below the at least one perforation zone to isolate a first flow of the pressurized fluid through perforations among the plurality of perforations of the at least one perforation zone,
   wherein the control valve is further configured to open or not employ the second isolation mechanism to direct a second flow of the pressurized fluid through the open bottom, and
   wherein the first flow fluidizes materials within an interior of the heap or pile and creates a plurality of substantially horizontal fluid channels in the materials in the interior of the heap or pile, and wherein the second flow creates a substantially vertical fluid channel within the interior of the heap or pile.

2. The system of claim 1, wherein the pressurized fluid comprises reagents to leach a target material from the heap or pile, including one or more formulated mixtures of solids, liquids, gases, or slurries.

3. The system of claim 1, wherein when the second isolation mechanism is not employed, the pressurized fluid pumped into the pipe flows through both the perforations of the drilled well casing and the open bottom to create a plurality of horizontal and vertical fluid channels.

4. The system of claim 1, wherein the heap or pile is above one or more of a foundation, a collection system, a liner, a natural contour of native earth, or compacted native earth.

5. The system of claim 1, wherein the heap or pile comprises a volume of fluid above a volume of material having low permeability, wherein the volume of fluid does not drain through the volume of material.

6. The system of claim 1, wherein the control valve controls one or more of a rate or volume of the pressurized fluid.

7. The system of claim 1, further comprising:
a collection system at a bottom of the heap or pile, the collection system configured to receive fluid from at least one of the horizontal or vertical fluid channels.

8. The system of claim 1, wherein the drilled well casing has a shear strength greater than a shear strength of the materials in the interior of the heap or pile.

9. The system of claim 1, wherein the pressurized fluid comprises one or more of a mineral reagent, a metal reagent, a lixiviant, or an added biochemical, chemical, or microbiological agent to alter one or more conditions of pH, Eh, chemistry, biochemistry, microbiological, or volume of the pressurized fluid.

10. The system of claim 1, wherein at least one of the first and second isolation mechanism comprises one or more of a plug, stopper, packer, stem, stent, or inflated or fluid filled hose, conduit or pipe to seal at least a portion of the drilled well casing.

11. The system of claim 1, wherein the first isolation mechanism is further configured to enable the pressurized fluid to improve a solubility of a target material to reagents or agents in the pressurized fluid.

12. The system of claim 1, further comprising a seal for the open top, the open bottom, or both the open top and the open bottom to temporarily or permanently protect short or long term pile stability by preventing the drilled well casing from being exposed to air, meteoric water, bacteria, yeasts, molds, or human interaction.

13. The system of claim 12, wherein the pile stability includes one or more of physical, chemical, biochemical, microbiological, or geotechnical stability.

14. The system of claim 12, wherein the seal is one or more of a cap, a plug, a stopper, a stem, or an inflated or fluid filled hose, conduit, pipe, or another sealing material.

15. The system of claim 7, further comprising:
one or more drains from the drilled well casing to the collection system to reduce accumulation of fluid within the heap or pile, wherein fluid flow through the one or more drains is controllable.

16. The system of claim 1, wherein the heap or pile comprises one or more selective layers of stacked material on or within the heap or pile, wherein the stacked material comprises one or more of a particular metal grade, mineral grade, chemistry, microbiologically, or hazardous or harmful property,
wherein the system further comprises a plurality of drilled well casings for unique treatment with the pressurized fluid.

17. A system for rechanneling fluid flow in a heap or pile, comprising:
a drilled well casing positioned substantially vertically within a heap or pile, the drilled well casing comprising an open top, an open bottom, and at least one perforation zone comprising a plurality of perforations along a vertical section of the drilled well casing;
a pressurized fluid;
a pipe positioned within the drilled well casing; and
a controlled isolation mechanism located above the open bottom of the drilled well casing and below the lowest perforated zone in the drilled well casing to deliver all the pressurized fluid flow through the open bottom of the drilled well casing to create only substantially vertical fluid channels within an interior of the heap or pile without allowing any pressurized fluid to exit the lowest perforation zone above the isolation mechanism.

* * * * *